United States Patent
Baessler et al.

(10) Patent No.: US 11,921,676 B2
(45) Date of Patent: Mar. 5, 2024

(54) ANALYZING DEDUPLICATED DATA BLOCKS ASSOCIATED WITH UNSTRUCTURED DOCUMENTS

(71) Applicant: International Business Machines Corporation, Armonk, NY (US)

(72) Inventors: Michael Baessler, Bempflingen (DE); Thomas Hampp-Bahnmueller, Stuttgart (DE); Yannick Saillet, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 175 days.

(21) Appl. No.: 17/537,470

(22) Filed: Nov. 29, 2021

(65) Prior Publication Data

US 2023/0169041 A1    Jun. 1, 2023

(51) Int. Cl.
*G06F 16/174* (2019.01)
*G06F 16/31* (2019.01)

(52) U.S. Cl.
CPC .......... *G06F 16/1748* (2019.01); *G06F 16/31* (2019.01)

(58) Field of Classification Search
None
See application file for complete search history.

(56) References Cited

U.S. PATENT DOCUMENTS

| | | | |
|---|---|---|---|
| 11,074,303 B2 | 7/2021 | Sabharwal et al. | |
| 2007/0294204 A1* | 12/2007 | Yeung | G06F 16/9574 |
| 2019/0080247 A1 | 3/2019 | Dubey et al. | |
| 2020/0349271 A1* | 11/2020 | Binkley | G06F 16/353 |
| 2021/0109682 A1* | 4/2021 | Engel | G06F 3/067 |
| 2021/0109919 A1 | 4/2021 | Raj et al. | |
| 2021/0157858 A1 | 5/2021 | Stevens et al. | |
| 2021/0216765 A1* | 7/2021 | Xu | G06V 30/414 |

FOREIGN PATENT DOCUMENTS

JP    6513562 B2 *  5/2019

OTHER PUBLICATIONS

Mell, Peter et al. The NIST Definition of Cloud Computing. National Institute of Standards and Technology, U.S. Department of Commerce, NIST Special Publication 800-145, Sep. 2011, 7 pages.

* cited by examiner

*Primary Examiner* — Hosain T Alam
*Assistant Examiner* — Anthony G Gemignani
(74) *Attorney, Agent, or Firm* — Brian M. Restauro

(57) ABSTRACT

Techniques are described relating to unstructured document processing. An associated computer-implemented method includes identifying a plurality of deduplicated data blocks associated with a collection of unstructured documents. The method further includes sorting the plurality of deduplicated data blocks in descending order based upon at least one block frequency metric, selecting a highest sorted unprocessed deduplicated data block, applying text analytics to the selected deduplicated data block, and applying at least one result of the text analytics to any document among the collection of unstructured documents including the selected deduplicated data block. The method is terminated responsive to satisfaction of at least one stopping condition.

20 Claims, 8 Drawing Sheets

ANALYZING DEDUPLICATED DATA BLOCKS ASSOCIATED WITH UNSTRUCTURED DOCUMENTS

BACKGROUND

The various embodiments described herein generally relate to unstructured document processing. More specifically, the various embodiments describe techniques of processing deduplicated data blocks associated with a collection of unstructured documents in a managed services domain of a cloud computing environment.

SUMMARY

The various embodiments described herein provide techniques of unstructured document processing. An associated computer-implemented method includes identifying a plurality of deduplicated data blocks associated with a collection of unstructured documents, sorting the plurality of deduplicated data blocks in descending order based upon at least one block frequency metric, selecting a highest sorted unprocessed deduplicated data block, applying text analytics to the selected deduplicated data block, and applying at least one result of the text analytics to any document among the collection of unstructured documents including the selected deduplicated data block. The method is terminated responsive to satisfaction of at least one stopping condition.

One or more additional embodiments pertain to a computer program product including a computer readable storage medium having unstructured document processing program instructions embodied therewith. According to such additional embodiment(s), the unstructured document processing program instructions are executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs an unstructured document processing operation. The unstructured document processing operation includes one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
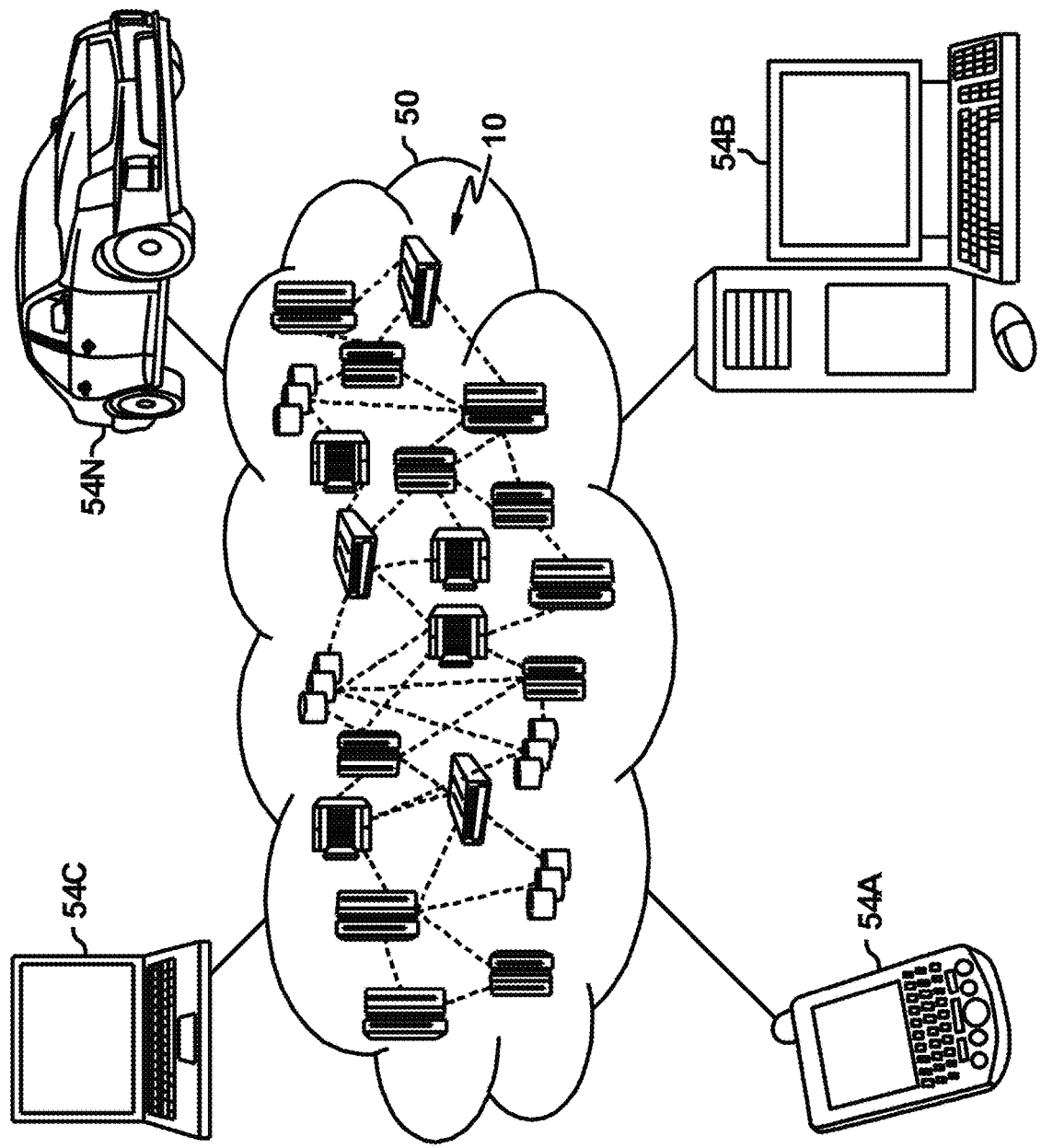
FIG. 1 depicts a cloud computing environment, according to one or more embodiments.

The various embodiments described herein are directed to techniques of processing unstructured documents in a managed services domain of a cloud computing environment. In the context of the various embodiments, a cloud computing environment is a virtualized environment in which one or more computing capabilities are available as a service. A data processing system of the cloud computing environment associated with the various embodiments optionally utilizes artificial intelligence capabilities of a machine learning knowledge model, specifically a text analytics learning model, as well as information of at least one knowledge base associated with such model.

The various embodiments may have advantages over conventional techniques. The various embodiments improve computer technology by enabling block-based text analytics rather than document-based text analytics. Specifically, the various embodiments leverage deduplicated data blocks to accelerate unstructured document processing by initiating text analytics based upon block selection rather than document selection. By applying text analytics to a respective deduplicated data block and applying at least one text analytics result to any unstructured document including the respective deduplicated data block, the various embodiments enable text analytics results application to multiple unstructured documents including the respective deduplicated data block in a single processing iteration rather than requiring separate processing iterations through the multiple unstructured documents, thus accelerating document processing. Block-based processing in accordance with the various embodiments functions as a multiplying factor in terms of data analytics, as such processing permits relatively more efficient analysis of a larger amount of data within a certain period of time. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to unstructured document processing in a managed services domain. However, it is to be understood that the techniques described herein may be adapted to a variety of purposes in addition to those specifically described herein. Accordingly, references to specific embodiments are included to be illustrative and not limiting.

The various embodiments described herein may be provided to end users through a cloud computing infrastructure. It is to be understood that although this disclosure includes a detailed description on cloud computing, implementation of the teachings recited herein is not limited to a cloud computing environment. Rather, the various embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Thus, cloud computing allows a user to access virtual computing resources (e.g., storage, data, applications, and even complete virtualized computing systems) in the cloud, without regard for the underlying physical systems (or locations of those systems) used to provide the computing resources. This cloud model may include at least five characteristics, at least three service models, and at least four deployment models.

Characteristics are as Follows:

On-demand self-service: A cloud consumer can unilaterally provision computing capabilities, such as server time and network storage, as needed automatically without requiring human interaction with the provider of the service.

Broad network access: Capabilities are available over a network and accessed through standard mechanisms that promote use by heterogeneous thin or thick client platforms (e.g., mobile phones, laptops, and personal digital assistants (PDAs)).

Resource pooling: The computing resources of the provider are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): The capability provided to the consumer is to use the applications of the provider running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. Central to cloud computing is an infrastructure that includes a network of interconnected nodes.

FIG. 1 illustrates a cloud computing environment 50, according to one or more embodiments. As shown, cloud computing environment 50 may include one or more cloud computing nodes 10 with which local computing devices used by cloud consumers, e.g., personal digital assistant or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds as described hereinabove, or a combination thereof. Accordingly, cloud computing environment 50 may offer infrastructure, platforms, and/or software as services for which a cloud consumer need not maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
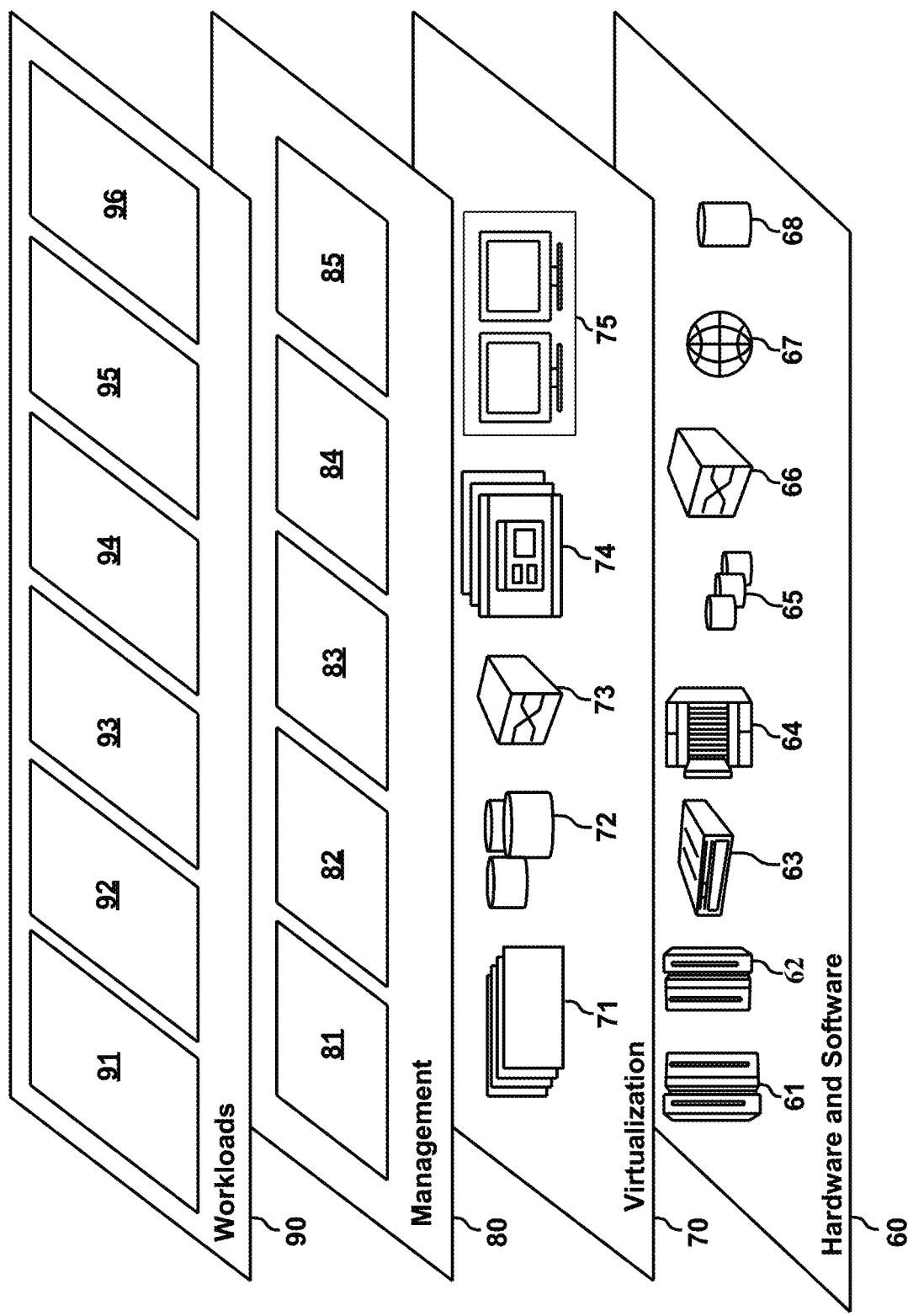
FIG. 2 depicts abstraction model layers provided by a cloud computing environment, according to one or more embodiments.

FIG. 2 illustrates a set of functional abstraction layers provided by cloud computing environment 50, according to one or more embodiments. It should be understood in advance that the components, layers, and functions shown in FIG. 2 are intended to be illustrative only; the various embodiments described herein are not limited thereto. As depicted, various layers and corresponding functions are provided. Specifically, hardware and software layer 60 includes hardware and software components. Examples of hardware components may include mainframes 61, RISC (Reduced Instruction Set Computer) architecture based servers 62, servers 63, blade servers 64, storage devices 65, and networks and networking components 66. In some embodiments, software components may include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 may provide dynamic procurement of computing resources and other resources that are utilized to perform tasks within cloud computing environment 50. Metering and pricing 82 may provide cost tracking as resources are utilized within cloud computing environment 50, and billing or invoicing for consumption of these resources. In one example, these resources may include application software licenses. Security provides identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 may provide pre-arrangement for, and procurement of, cloud computing resources for which a future requirement is anticipated in accordance with a SLA.

Workloads layer 90 provides examples of functionality for which cloud computing environment 50 may be utilized. Examples of workloads and functions which may be provided from this layer include: mapping and navigation 91; software development and lifecycle management 92; virtual classroom education delivery 93; data analytics processing 94; transaction processing 95; and unstructured document processing 96. Unstructured document processing 96 may enable processing deduplicated data blocks associated with a collection of unstructured documents in accordance with the various embodiments described herein.

Figure 3:
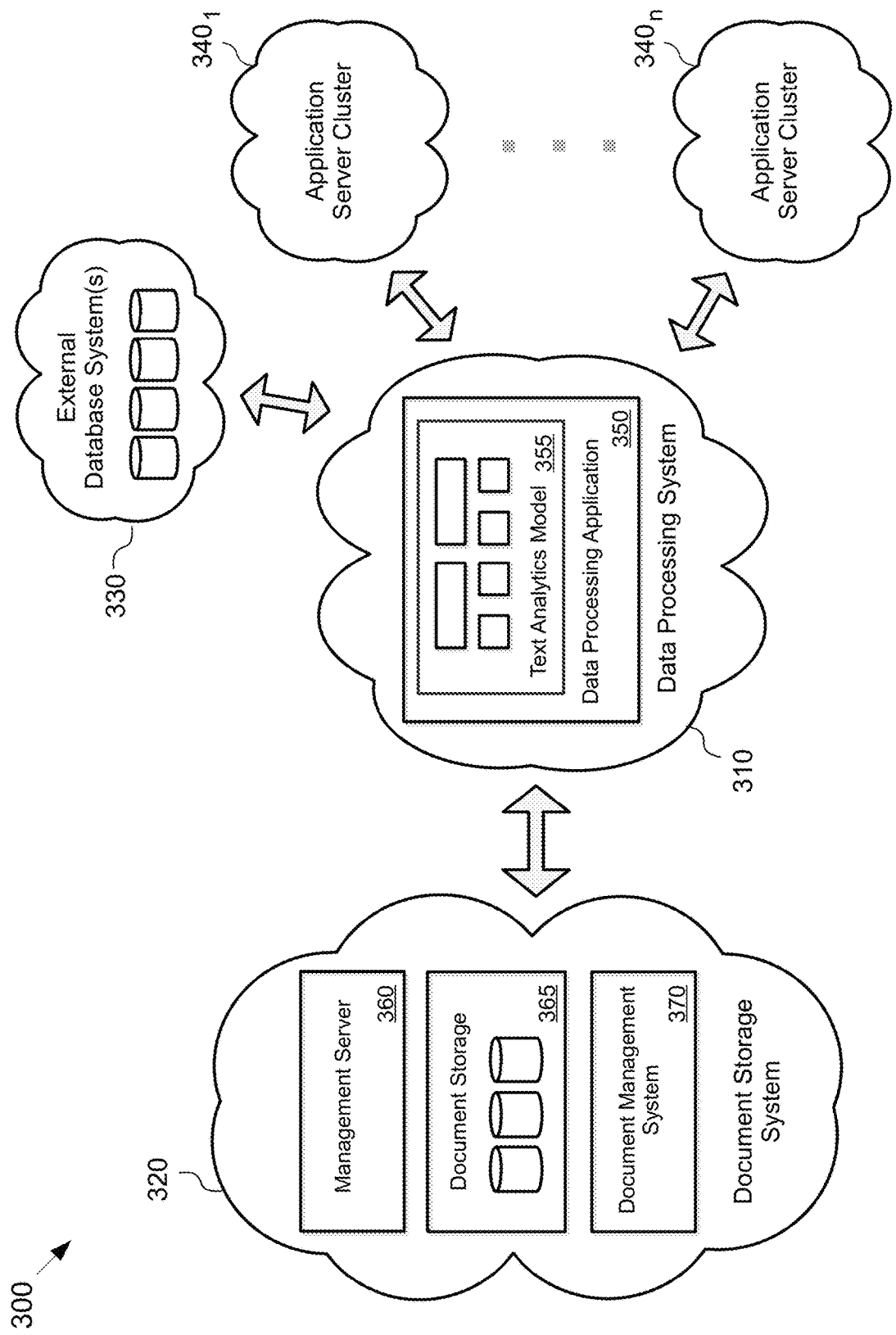
FIG. 3 depicts a managed services domain in a cloud computing environment, according to one or more embodiments.

FIG. 3 illustrates a managed services domain 300 in cloud computing environment 50. Functionality related to unstructured document processing 96 and other workloads/functionality may be carried out in managed services domain 300. Managed services domain 300 includes data processing system 310, document storage system 320, one or more external database systems 330, and a plurality of application server clusters $340_1$ to $340_n$. As shown, data processing system 310 includes a data processing application 350. Data processing application 350 includes a text analytics learning model 355, which incorporates machine learning knowledge model capabilities. Data processing application 350 is representative of a single application or multiple applications. Text analytics learning model 355 is configured to facilitate unstructured document processing in accordance with the various embodiments described herein. In an alternative embodiment, one or more aspects of data processing system 310 are incorporated into a hardware-based local server infrastructure. According to such alternative embodiment, such one or more aspects of data processing system 310 interface with one or more aspects of the managed services domain 300 and/or cloud computing environment 50 more generally via at least one network-based connection. In a further embodiment, data processing system 310 is configured to communicate with document storage system 320, the one or more external database systems 330, and the plurality of application server clusters $340_1$ to $340_n$. Additionally, respective servers within application server clusters $340_1$ to $340_n$ optionally are configured to communicate with one another and/or with server clusters in other domains.

As shown, document storage system 320 includes management server 360, document storage 365, and document management system 370. Management server 360 is configured to communicate with other aspects of managed services domain 300, including data processing system 310. In an embodiment, document storage 365 includes at least one database, optionally at least one relational database. Additionally or alternatively, document storage 365 includes at least one file system, optionally at least one File Transfer Protocol (FTP) system. In an additional embodiment, document storage 365 stores data associated with at least one knowledge base of text analytics learning model 355. In a further embodiment, document management system 370 is or includes a database management system (DBMS), optionally a relational database management system (RDBMS). In a further embodiment, document management system 370 manages or otherwise interacts with the one or more external database systems 330. In a further embodiment, document management system 370 includes one or more ontology trees or other ontological structures. In a further embodiment, document management system 370 coordinates and manages at least one knowledge base of text analytics learning model 355. Document management system 370 is configured to manage storage of physical data blocks and/or logical data blocks. In an alternative embodiment, some or all aspects of document management system 370 are incorporated into management server 360. In a further alternative embodiment, one or more aspects of document storage system 320 are incorporated into a hardware-based local server infrastructure. According to such further alternative embodiment, such one or more aspects of document storage system 320 interface with one or more aspects of managed services domain 300 and/or cloud computing environment 50 more generally via at least one network-based connection.

The one or more external database systems 330 optionally include at least one database/relational database or at least one DBMS/RDBMS configured to interface with document management system 370. In a further embodiment, document management system 370 and/or at least one DBMS/RDBMS included in the one or more external database systems 330 store relationships between the plurality of application server clusters $340_1$ to $340_n$ and the at least one knowledge base. Application server clusters $340_1$ to $340_n$ are configured to host and/or store aspects of various applications and also are configured to provide managed services to one or more client systems and/or data systems, including data processing system 310 or document storage system 320.

Figure 4:
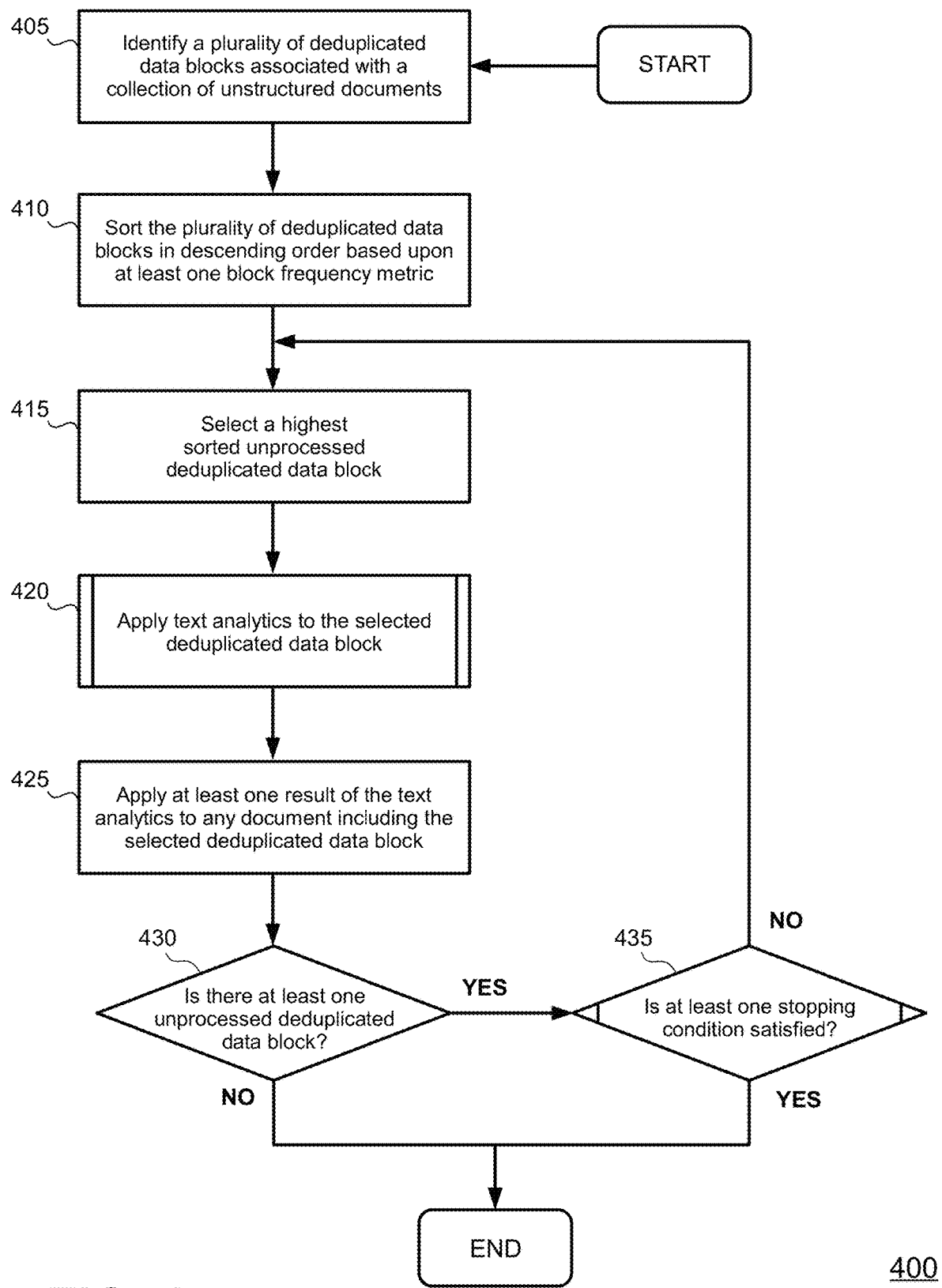
FIG. 4 illustrates a method of processing a collection of unstructured documents in a managed services domain, according to one or more embodiments.

FIG. 4 illustrates an unstructured document processing method 400. In an embodiment, one or more steps associated with the method 400 are carried out in an environment in which computing capabilities are provided as a service (e.g., cloud computing environment 50). According to such embodiment, one or more steps associated with the method 400 are carried out in a managed services domain within the environment (e.g., managed services domain 300). The environment optionally is a hybrid cloud environment. In a further embodiment, one or more steps associated with the method 400 are carried out in one or more other environments, such as a client-server network environment or a peer-to-peer network environment. A data processing system in the managed services domain (e.g., data processing system 310) may facilitate processing according to the method 400 and the other methods further described herein. More specifically, a data processing application in the data processing system (e.g., data processing application 350) may execute or otherwise facilitate one or more steps of the method 400 and the other methods described herein. The unstructured document processing techniques facilitated or otherwise carried out via the data processing system in the managed services domain may be associated with unstructured data processing within a workloads layer among functional abstraction layers provided by the environment (e.g., unstructured document processing 96 within workloads layer 90 of cloud computing infrastructure 50).

The method 400 begins at step 405, where the data processing application identifies a plurality of deduplicated data blocks associated with a collection of unstructured documents. The collection of unstructured documents optionally is stored in and/or is accessible via a document storage system within or otherwise associated with the managed services domain (e.g., document storage system 320). The collection of unstructured documents may be referred to as a data corpus. In an embodiment, the plurality of deduplicated data blocks include physical data blocks corresponding to portions of physical data storage and/or memory, e.g., from the document storage system. Additionally or alternatively, the plurality of deduplicated data blocks include logical data blocks, i.e., virtualized data blocks, managed by the data processing application and/or at least one content management application associated with the document storage system. Such logical data blocks are organized and/or managed without regard to physical data storage or physical memory layout, as they are virtualized via application software. The plurality of deduplicated data blocks are stored to avoid separate and unnecessary storage of duplicate blocks of data, which as further described herein enables more efficient data analysis. Each of the plurality of deduplicated data blocks is a configurable size, optionally measured in bytes.

The plurality of deduplicated data blocks identified at step 405 optionally are stored in and/or are accessible via the document storage system. In an embodiment, the data processing application identifies one or more of the plurality of deduplicated data blocks according to step 405 through communication with the document storage system. The document storage system includes at least one management server (e.g., management server 360) configured to interface with the data processing application and/or other aspects of the data processing system. The document storage system optionally includes one or more databases (e.g., incorporated into and/or accessible via document storage 365). Additionally or alternatively, the document storage system includes one or more file server systems such as an FTP system (e.g., incorporated into and/or accessible via document storage 365). The document storage system further includes at least one document management system (e.g., document management system 370) configured to store, access, or otherwise manage documents, including the collection of unstructured documents, and other data in respective storage locations defined by a system-specific implementation. Such storage locations include physical blocks and/or logical blocks. In an embodiment, some or all aspects of the document storage system are cloud-based.

At step 410, the data processing application sorts the plurality of deduplicated data blocks in descending order based upon at least one block frequency metric. In an embodiment, the data processing application sorts the plurality of deduplicated data blocks by creating a reference list including the plurality of deduplicated data blocks, the plurality of deduplicated data blocks in the reference list sorted in descending order based upon the at least one block frequency metric. The reference list optionally is stored as a data structure, e.g., a linked list or a sorted array. In a related embodiment, the reference list indexes deduplicated data blocks both by document and by document location, such that the reference list includes for each deduplicated data block both a record of each document among the collection of unstructured documents including the deduplicated data block and a record of respective location(s) of the deduplicated data block within each document. In an alternative related embodiment, the reference list indexes deduplicated data blocks only by document, in which case the reference list includes for each deduplicated data block only a record of each document among the collection of unstructured documents including the deduplicated data block and does not include a record of respective block location(s) within each document.

In an embodiment, the at least one block frequency metric includes unique document usage frequency. According to such embodiment, the data processing application sorts the plurality of deduplicated data blocks in descending order by unique document usage frequency. In the context of the various embodiments, unique document usage frequency of a deduplicated data block is defined as a number of unique documents in which a deduplicated data block is located. The unique document frequency value is equivalent to a number of documents including at least one instance of a deduplicated data block. The unique document usage frequency measures block sharing frequency among documents. The unique document usage frequency for a deduplicated data block is directly proportional to sharing frequency of a deduplicated data block among the collection of unstructured documents. Optionally, unique document usage frequency of a deduplicated data block is represented as an integer value corresponding to a number of documents among the collection of unstructured documents in which the block is located. Alternatively, unique document usage frequency of a deduplicated data block is represented as a percentage value corresponding to a percentage of documents among the collection of unstructured documents in which the block is located. In an additional embodiment, the at least one block frequency metric includes unique block occurrence frequency. According to such additional embodiment, the data processing application sorts the plurality of deduplicated data blocks in descending order by unique block occurrence frequency. In the context of the various embodiments, unique block occurrence frequency of a deduplicated data block is defined as a number of unique occurrences of the deduplicated data block within the collection of unstructured documents. In a data processing scenario in which a deduplicated data block is used at most one time within any document among the collection of unstructured documents, the unique block occurrence frequency of such deduplicated data block is equal to the unique document usage frequency of such deduplicated data block. Optionally, unique block occurrence frequency of a deduplicated data block is represented as an integer value corresponding to a number of occurrences of the block within the collection of unstructured documents.

In an embodiment, the data processing application sorts the plurality of deduplicated data blocks in descending order at step 410 based upon only one block frequency metric. According to such embodiment, the data processing application optionally sorts the plurality of deduplicated data blocks in descending order only by unique document usage frequency value or only by unique block occurrence frequency value. In an additional embodiment, the data processing application sorts the plurality of deduplicated data blocks in descending order based upon a combination of multiple block frequency metrics. According to such additional embodiment, the data processing application optionally sorts the plurality of deduplicated data blocks in descending order at step 410 by aggregating, e.g., by summing or averaging, a respective unique document usage frequency value and a respective unique block occurrence frequency value of each of the plurality of deduplicated data blocks. Specifically, for each of the plurality of deduplicated data blocks, the data processing application optionally sums or averages a respective unique document usage frequency value, e.g., an integer value, reflecting a number of unique documents in which the block is located and a respective unique block occurrence frequency value, e.g., an integer value, reflecting a number of block occurrences within the collection of unstructured documents.

In an embodiment, the data processing application obtains one or more of the at least one block frequency metric, e.g., a unique document usage frequency value and/or a unique block occurrence frequency value, of a respective deduplicated data block by consulting an index file. The index file optionally includes one or more other metrics associated with one or more of the plurality of deduplicated data blocks. In an additional embodiment, the index file includes an inverted index data structure storing mappings from respective deduplicated data blocks to one or more documents among the collection of unstructured documents. An inverted index mapping optionally indicates presence of a deduplicated data block within one or more documents among the collection of unstructured documents. Furthermore, an inverted index mapping optionally includes information regarding location of the deduplicated data block within one or more documents among the collection of unstructured documents. The location information includes absolute data block position within a document and/or data block position within a document relative to other data blocks. Optionally, the index file is an implementation of the previously described reference list created in the context of sorting according to step 410.

At step 415, the data processing application selects a highest sorted unprocessed deduplicated data block among the plurality of deduplicated data blocks. According to step 415, the data processing application selects a yet to be selected deduplicated data block that is sorted highest based upon the at least one block frequency metric. An unprocessed deduplicated data block in the context of step 415 is a block that the data processing application has not yet selected for text analysis. According to an embodiment in which the data processing application creates a reference list sorted in descending order based upon the at least one block frequency metric, the data processing application selects an unprocessed deduplicated data block by selecting an unprocessed deduplicated data block at a highest position in the reference list. By selecting an unprocessed deduplicated data block having a highest sorted value based upon the at least one block frequency metric, the data processing application prioritizes unstructured content analytics with deduplicated data blocks having highest block frequency among the collection of unstructured documents, with processing continuing in descending order based upon the at least one block frequency metric. By prioritizing deduplicated data blocks based upon the at least one block frequency metric, insights obtained based upon deduplicated data block analytics are applicable to a relatively larger number of documents (or document portions) relatively quickly. Based upon steps 410 and 415, the data processing application selects deduplicated data blocks in an order from highest to lowest sorted value based upon the at least one block frequency metric.

At step 420, the data processing application applies text analytics to the selected deduplicated data block. In an embodiment, the data processing application applies text analytics by facilitating application of at least one natural language processing (NLP) technique to the selected deduplicated data block. The at least one NLP technique optionally incorporates natural language understanding (NLU). The data processing application optionally applies NLP techniques and/or optionally facilitates an application programming interface (API) call to an application having NLP capabilities, e.g., at least one cloud-based NLP application. The data processing application optionally applies NLP for purposes of contextual analytics and/or logical relationship analytics. In the context of the various embodiments, contextual analytics of a data block includes analysis of one or more textual elements of the data block in view of one or more other textual elements of the data block. In the context of the various embodiments, logical relationship analytics of a data block includes analysis of at least one measurable correlation between or among textual elements of the data block. In a related embodiment, the data processing application facilitates application of at least one NLP technique by applying a recurrent neural network (RNN) model to aspects of the selected deduplicated data block in order to establish machine learning (deep learning) based connections, e.g., contextual connections and/or logical relationship connections, among datapoints within the deduplicated data block. In a further embodiment, upon identifying audio within the selected deduplicated data block, such as voice utterances, the data processing application optionally applies at least one automatic speech recognition (ASR) technique, e.g., speech-to-text, to the selected deduplicated data block in order to derive text-based aspects from the audio and subsequently applies NLP to the derived text-based aspects. In a further embodiment, upon identifying visual imagery within the selected deduplicated data block, such as still pictures and/or video of user activity or activity of associated contacts, the data processing application optionally applies video recognition, e.g., video-to-text, to the selected deduplicated data block in order to derive text-based aspects from the visual imagery and subsequently applies NLP to the derived text-based aspects.

In an embodiment, the data processing application applies text analytics in order to identify data attributes within the selected deduplicated data block. For instance, the data processing application optionally identifies all data within the selected deduplicated data block associated with a particular entity. According to such embodiment, the data processing application identifies datapoints associated with a particular entity, including data access characteristics such as data access instances and/or data access patterns. In the context of the various embodiments, an entity may be an individual, a group of individuals, or an organization. In a further embodiment, the data processing application applies text analytics in order to identify data security aspects, optionally including data security risk factors, within the selected deduplicated data block. According to such further embodiment, the data processing application identifies sensitive data. Such sensitive data optionally includes confidential data and/or data of relatively high interest to at least one entity associated with one or more documents among the collection of unstructured documents. Such sensitive data optionally includes personal information associated with an individual, personal information associated with one or more of a group of individuals, and/or organization information associated with a company, agency, assembly, or other group.

In an embodiment, the data processing application applies contextual analytics to the selected deduplicated data block. In a further embodiment, the data processing application applies logical relationship analytics to the selected deduplicated data block. Such embodiments are applicable to deduplicated data blocks including multiple bytes. A deduplicated data block having a size of multiple bytes includes enough data to permit analysis of context among and/or logical relationships among block n-grams or other block portions (e.g., among words or other data aspects). In the context of the various embodiments, an n-gram is defined as a contiguous sequence of "n" items in a document. The data processing application applies contextual analytics and/or logical relationship analytics in order to facilitate characterization of data attributes and/or to facilitate identification of data security aspects such as sensitive information. The data processing application applies contextual analytics and/or logical relationship analytics in order to identify a contextual relationship and/or a logical relationship between an entity and at least one associated n-gram within the selected deduplicated data block. With regard to an entity associated with the selected deduplicated data block, analysis of such entity in isolation may not provide context regarding potentially sensitive information associated with such entity. However, application of contextual analytics and/or logical relationship analytics between such entity and at least one associated n-gram may indicate sensitivity of information associated with such entity. For example, while identification of a date within the selected deduplicated data block alone may not result in significant analytics results, analysis of such date along with relevant contextual information and/or logical relationship information associated with the block may reveal that such date is sensitive or has other significance to an entity, e.g., an individual's birthdate. In another example, while identification of a name within the selected deduplicated data block alone may not result in significant analytics results, analysis of such name along with relevant contextual information and/or logical relationship information associated with the block may reveal that such name is sensitive in the context of one or more entities associated with the block. As further described herein, the data processing application optionally applies contextual analytics and/or logical relationship analytics in order to configure a learning model based in text analytics for purposes of evaluating data block sensitivity, including determining whether to classify the selected deduplicated data block as sensitive. According to step 420, the data processing application initiates text analytics based upon deduplicated data block selection rather than document selection. The data processing application applies text analysis to the selected deduplicated data block according to step 420 a single time rather than each time the selected deduplicated data block occurs in a document among the collection of unstructured documents. A method with regard to applying text analytics to the selected deduplicated data block according to step 420 is described with respect to FIG. 6.

At step 425, the data processing application applies at least one result of the text analytics to any document among the collection of unstructured documents including the selected deduplicated data block. In an embodiment, the data processing application identifies any document among the collection of unstructured documents including the selected deduplicated data block by retrieving, e.g., from the previously discussed reference list, any document identification data associated with the selected deduplicated data block, including document identification parameters associating documents among the collection of unstructured documents with the block. According to an embodiment in which the data processing application applies text analytics to the selected deduplicated data block in order to determine data attributes within the block, applying at least one result of the text analytics optionally includes labelling or otherwise marking aspects of any document or portion thereof including the block based upon the determined data attributes. In an embodiment, the data processing application first labels document data based upon the determined data attributes and then characterizes the labelled data by applying at least one supervised machine learning classification technique, e.g., by applying at least one classification algorithm, or by applying at least one unsupervised machine learning clustering technique, e.g., by applying at least one clustering algorithm. For instance, the data processing application optionally labels a document based upon identification of a birthdate associated with an individual and then designates a document type and/or classifies or clusters respective document aspects based upon such labelling.

According to an embodiment in which the data processing application applies text analytics to the selected deduplicated data block in order to identify data security aspects, applying at least one result of the text analytics at step 425 optionally includes addressing any such data security aspects within any document or portion thereof including the block. In a related embodiment, addressing any such data security aspects optionally includes removing or quarantining any data associated with one or more data security aspects within any document or at any document location including the selected deduplicated data block. In a further related embodiment, addressing any such data security aspects optionally includes labelling or otherwise marking any document or portion thereof including the selected deduplicated data block in order to identify any data security risk factor. As further described herein, responsive to classifying as sensitive the selected deduplicated data block, addressing any such data security aspects optionally includes classifying as sensitive any document or portion thereof including the selected deduplicated data block. By applying the at least one result to any document including the selected deduplicated data block according to step 425, the various embodiments enable analysis and application of analysis results to multiple documents among the collection of unstructured documents that include the selected deduplicated data block in a single processing iteration rather than requiring separate processing iterations through each of the multiple documents including the selected deduplicated data block. By reducing processing iterations, block-based text analytics of the various embodiments accelerate unstructured document analysis. Furthermore, consequent to such streamlined block-based text analytics, less resources are consumed, thus increasing efficiency.

In an alternative embodiment, the data processing application applies steps of the method 400 to deduplicated data blocks within respective portions of a single unstructured document. According to such alternative embodiment, the data processing application at step 420 applies text analytics to a selected deduplicated data block and at step 425 applies at least one result of the text analytics to any document portion within the single unstructured document including the selected deduplicated data block. According to such alternative embodiment, by applying the at least one result to any portion of a single unstructured document including the selected deduplicated data block, the various embodiments permit text analytics and application of text analytics results to multiple portions of the single unstructured document that include the selected deduplicated data block in a single processing iteration rather than requiring separate processing iterations through each of the multiple portions including the selected deduplicated data block.

At step 430, the data processing application determines whether there is at least one unprocessed deduplicated data block to be selected among the plurality of deduplicated data blocks. According to step 430, the data processing application determines whether there is at least one deduplicated data block yet to be selected for text analytics application. Responsive to determining that there is no unprocessed deduplicated data block to be selected, e.g., due to all deduplicated data blocks already having been selected, the data processing application proceeds to the end of the method 400. Responsive to determining that there is at least one unprocessed deduplicated data block to be selected, the data processing application proceeds to step 435.

At step 435, the data processing application determines whether at least one stopping condition is satisfied. In the context of the method 400, a stopping condition is a condition mandating that the data processing application terminate deduplicated data block processing. Responsive to determining that at least one stopping condition is satisfied, the data processing application proceeds to the end of the method 400. Accordingly, the data processing application terminates the method 400 responsive to satisfaction of at least one stopping condition. Responsive to determining that no stopping condition is satisfied, the data processing application returns to step 415 to select a highest sorted unprocessed deduplicated data block. A method with regard to determining whether at least one stopping condition is satisfied according to step 435 is described with respect to FIG. 5.

Figure 5:
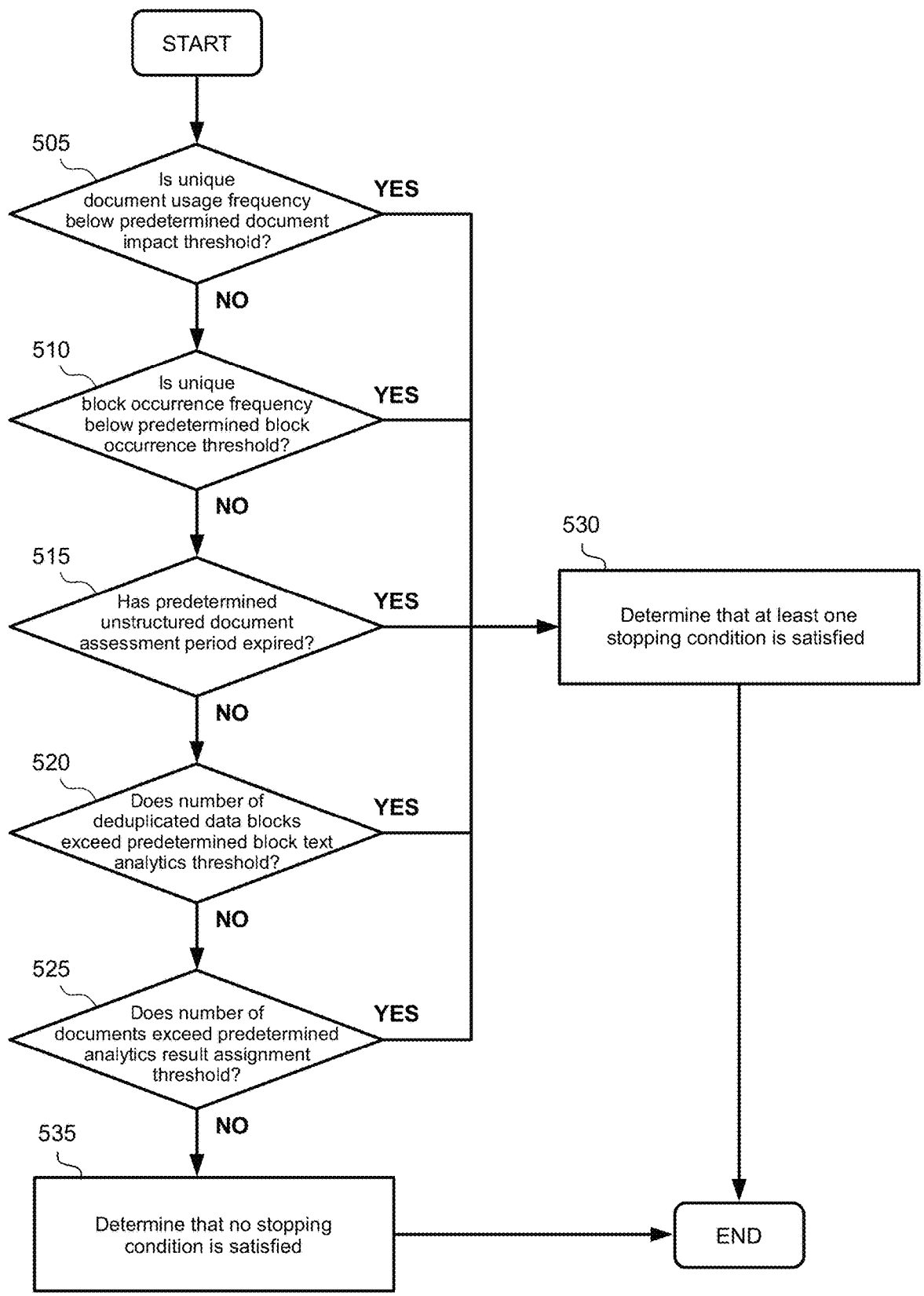
FIG. 5 illustrates a method of determining whether at least one stopping condition associated with the unstructured document processing method illustrated in FIG. 4 is satisfied, according to one or more embodiments.

FIG. 5 illustrates a method 500 of determining whether at least one stopping condition is satisfied. The method 500 provides one or more embodiments with respect to step 435 of the method 400. The method 500 begins at step 505, where the data processing application determines whether unique document usage frequency of a next unprocessed deduplicated data block to be selected is below a predetermined document impact threshold. The data processing application identifies the next unprocessed deduplicated data block to be selected among the plurality of deduplicated data blocks by determining a highest sorted unprocessed deduplicated data block based upon the at least one block frequency metric, e.g., by consulting the previously described reference list. Responsive to determining that unique document usage frequency of the next unprocessed deduplicated data block to be selected is below the predetermined document impact threshold, the data processing application proceeds to step 530, where the data processing application determines that at least one stopping condition is satisfied and proceeds to the end of the method 500. Consequent to determining that at least one stopping condition is satisfied according to step 530, per step 435 the data processing application proceeds to the end of the method 400, thus terminating further unstructured document processing. Accordingly, consequent to execution of steps 505 and 530 in the context of determining whether at least one stopping condition is satisfied at step 435, the data processing application terminates the unstructured document processing method 400 responsive to determining that unique block occurrence frequency of the next unprocessed deduplicated data block to be selected is below the predetermined document impact threshold. In an embodiment, consequent to execution of steps 505 and 530, the data processing application terminates the method 400 prior to applying text analytics to the next unprocessed deduplicated data block to be selected and prior to applying at least one result of the text analytics to any document among the collection of unstructured documents including the block. Terminating the method 400 based upon the predetermined document impact threshold may increase method efficiency, since the data processing application may refrain from analyzing one or more deduplicated data blocks yet to be selected that have relatively less document impact than previously selected deduplicated data blocks. Responsive to determining that unique document usage frequency of the next unprocessed deduplicated data block to be selected is not below the predetermined document impact threshold, the data processing application proceeds to step 510. In a further embodiment, the data processing application applies unique document usage frequency as a stopping condition according to step 505 even if unique document usage frequency is not among the at least one at least one block frequency metric applied for purposes of sorting the plurality of deduplicated data blocks at step 410.

At step 510, the data processing application determines whether unique block occurrence frequency of the next unprocessed deduplicated data block to be selected is below a predetermined block occurrence threshold. In an embodiment, the predetermined block occurrence threshold is equal to the predetermined document impact threshold. Responsive to determining that unique block occurrence frequency of the next unprocessed deduplicated data block to be selected is below the predetermined block occurrence threshold, the data processing application proceeds to step 530, where the data processing application determines that at least one stopping condition is satisfied and proceeds to the end of the method 500. Consequent to determining that at least one stopping condition is satisfied according to step 530, per step 435 the data processing application proceeds to the end of the method 400, thus terminating further unstructured document processing. Accordingly, consequent to execution of steps 510 and 530 in the context of determining whether at least one stopping condition is satisfied at step 435, the data processing application terminates the unstructured document processing method 400 responsive to determining that unique block occurrence frequency of the next unprocessed deduplicated data block to be selected is below the predetermined block occurrence threshold. Responsive to determining that unique block occurrence frequency of the next unprocessed deduplicated data block to be selected is not below the predetermined block occurrence threshold, the data processing application proceeds to step 515. In a further embodiment, the data processing application applies unique block occurrence frequency as a stopping condition according to step 510 even if unique block occurrence frequency is not among the at least one at least one block frequency metric applied for purposes of sorting the plurality of deduplicated data blocks at step 410.

At step 515, the data processing application determines whether a predetermined unstructured document assessment period has expired. In an embodiment, the unstructured document assessment period is a fixed duration of time. Responsive to determining that the predetermined unstructured document assessment period has expired, the data processing application proceeds to step 530, where the data processing application determines that at least one stopping condition is satisfied and proceeds to the end of the method 500. Consequent to determining that at least one stopping condition is satisfied according to step 530, per step 435 the data processing application proceeds to the end of the method 400, thus terminating further unstructured document processing. Accordingly, consequent to execution of steps 515 and 530 in the context of determining whether at least one stopping condition is satisfied at step 435, the data processing application terminates the unstructured document processing method 400 responsive to determining that the predetermined unstructured document assessment period has expired. Responsive to determining that the predetermined unstructured document assessment period has not expired, the data processing application proceeds to step 520. In an alternative embodiment, upon determining that the predetermined unstructured document assessment period has expired, the data processing application immediately ends the method 400 and furthermore immediately ends the method 500 if applicable.

At step 520, the data processing application determines whether a number of deduplicated data blocks among the plurality of deduplicated data blocks to which text analytics have been applied exceeds a predetermined block text analytics threshold. In one embodiment, a number of deduplicated data blocks among the plurality of deduplicated data blocks as compared to the predetermined block text analytics threshold is a quantity of blocks, in which case the predetermined block text analytics threshold is an integer value. In an alternative embodiment, a number of deduplicated data blocks among the plurality of deduplicated data blocks as compared to the predetermined block text analytics threshold is a percentage of blocks, in which case the predetermined block text analytics threshold is a percentage value. Responsive to determining that the number of deduplicated data blocks among the plurality of deduplicated data blocks to which text analytics have been applied exceeds the predetermined block text analytics threshold, the data processing application proceeds to step 530, where the data processing application determines that at least one stopping condition is satisfied and proceeds to the end of the method 500. Consequent to determining that at least one stopping condition is satisfied according to step 530, per step 435 the data processing application proceeds to the end of the method 400, thus terminating further unstructured document processing. Accordingly, consequent to execution of steps 520 and 530 in the context of determining whether at least one stopping condition is satisfied at step 435, the data processing application terminates the unstructured document processing method 400 responsive to determining that the number of deduplicated data blocks among the plurality of deduplicated data blocks to which text analytics have been applied exceeds the predetermined block text analytics threshold. According to step 520, the data processing application terminates the unstructured document processing method 400 responsive to determining that a number of deduplicated data blocks already selected and processed according to step 420 exceeds the predetermined block text analytics threshold. Responsive to determining that the number of deduplicated data blocks among the plurality of deduplicated data blocks to which text analytics have been applied does not exceed the predetermined block text analytics threshold, the data processing application proceeds to step 525.

At step 525, the data processing application determines whether a number of documents among the collection of unstructured documents to which at least one text analytics result has been applied exceeds a predetermined analytics result assignment threshold. In one embodiment, a number of documents among the collection of unstructured documents as compared to the predetermined analytics result assignment threshold is a quantity of documents, in which case the predetermined analytics result assignment threshold is an integer value. In an alternative embodiment, a number of documents among the collection of unstructured documents as compared to the predetermined analytics result assignment threshold is a percentage of documents, in which case the predetermined analytics result assignment threshold is a percentage value. Responsive to determining that the number of documents among the collection of unstructured documents to which at least one text analytics result has been applied exceeds the predetermined analytics result assignment threshold, the data processing application proceeds to step 530, where the data processing application determines that at least one stopping condition is satisfied and proceeds to the end of the method 500. Consequent to determining that at least one stopping condition is satisfied according to step 530, per step 435 the data processing application proceeds to the end of the method 400, thus terminating further unstructured document processing. Accordingly, consequent to execution of steps 525 and 530 in the context of determining whether at least one stopping condition is satisfied at step 435, the data processing application terminates the unstructured document processing method 400 responsive to determining that the number of documents among the collection of unstructured documents to which at least one text analytics result has been applied exceeds the predetermined analytics result assignment threshold. According to step 525, the data processing application terminates the unstructured document processing method 400 responsive to determining that a number of documents processed according to step 425 exceeds the predetermined analytics result assignment threshold. Responsive to determining that the number of documents among the collection of unstructured documents to which at least one text analytics result has been applied does not exceed the predetermined analytics result assignment threshold, the data processing application proceeds to step 535, where the data processing application determines that no stopping condition is satisfied. Consequent to determining that no stopping condition is satisfied according to step 535, per step 435 the data processing application returns to step 415 to select a highest sorted unprocessed deduplicated data block.

The data processing application applies a respective stopping condition at each of steps 505-525. In one or more embodiments, the data processing application applies the respective stopping conditions of steps 505-525 in any sequence. Optionally, the data processing application determines order of application of multiple stopping conditions based at least in part upon input obtained from at least one external entity, e.g., a data processing system administrator and/or a data processing system client. Optionally, one or more of the respective thresholds applied at steps 505-525 are predetermined by the data processing application and/or are predetermined based upon input obtained from at least one external entity. In one or more additional embodiments, the data processing application applies only a subset of the stopping conditions of steps 505-525 in order to determine stopping condition satisfaction. The data processing application optionally applies only a single stopping condition among the stopping conditions of steps 505-525 in order to determine stopping condition satisfaction. Optionally, the data processing application determines whether to apply all stopping conditions or a subset of stopping conditions based at least in part upon input obtained from at least one external entity.

Figure 6:
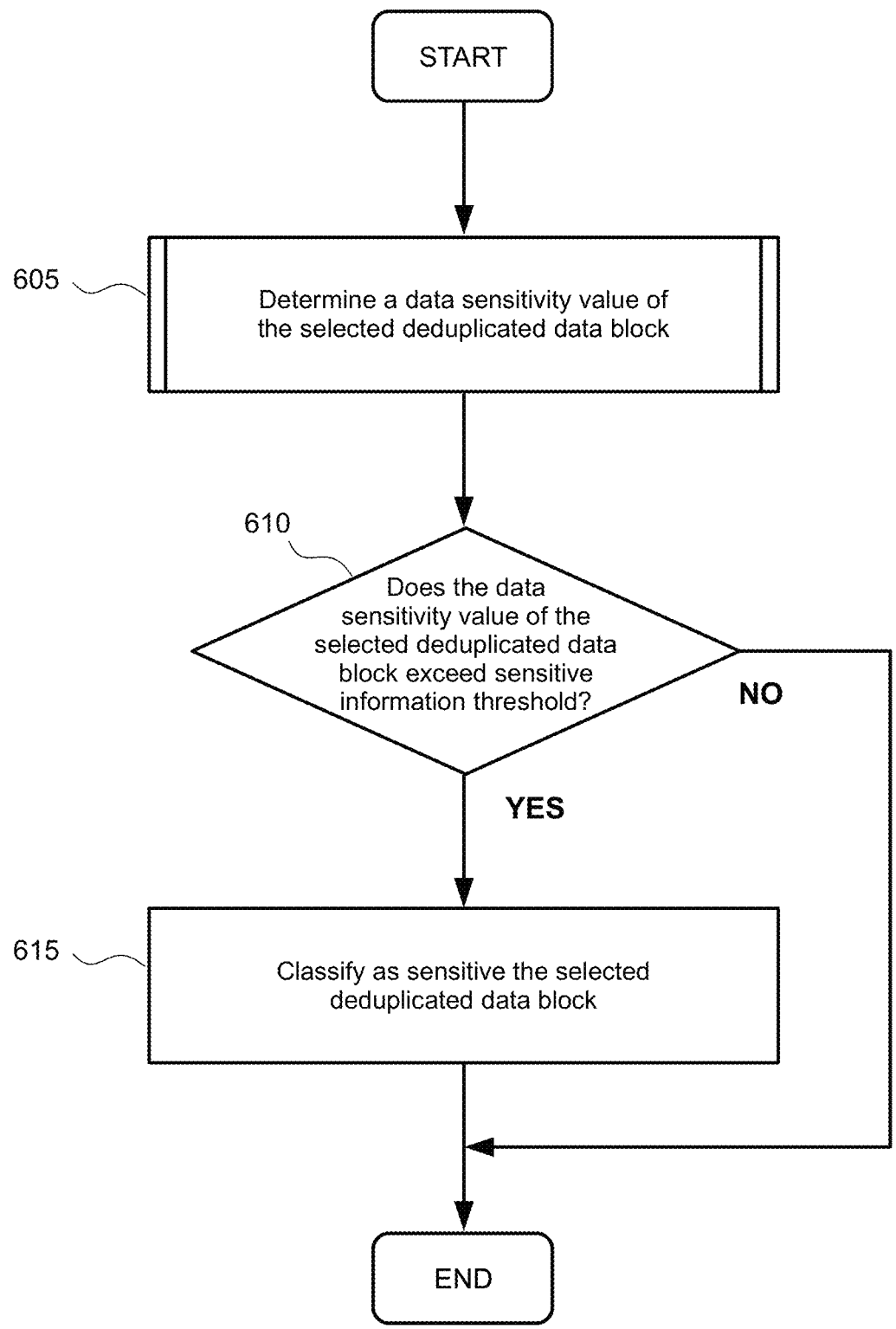
FIG. 6 illustrates a method of applying text analytics to a deduplicated data block selected in the context of unstructured document processing, according to one or more embodiments.

FIG. 6 illustrates a method 600 of applying text analytics to the selected deduplicated data block. The method 600 provides one or more embodiments with respect to step 420 of the method 400. The method 600 begins at step 605, where the data processing application determines a data sensitivity value of the selected deduplicated data block by evaluating data in the selected deduplicated data block in view of a text analytics learning model (e.g., text analytics learning model 355). In an embodiment, the data processing application determines the data sensitivity value according to step 605 at least in part based upon archived sensitive data associated with the text analytics learning model. According to such embodiment, the data processing application evaluates data within the selected deduplicated data block by facilitating comparison of block data to the archived sensitive data. The data processing application optionally determines a relatively higher data sensitivity value for the selected deduplicated data block responsive to determining a relatively higher level of similarity between block data and the archived sensitive data. The archived sensitive data pertains to one or more entities associated with one or more documents among the collection of unstructured documents. Optionally, the archived sensitive data includes personal information pertaining to the one or more entities. The data processing application identifies and evaluates any personal information associated with the selected deduplicated data block based upon comparison to personal information included in the archived sensitive data. Additionally or alternatively, the archived sensitive data includes confidential information pertaining to the one or more entities, e.g., authentication information such as password data. The data processing application identifies and evaluates any confidential information associated with the selected deduplicated data block based upon comparison to confidential information included in the archived sensitive data. As further described herein, the data processing application facilitates training of the text analytics learning model based upon the archived sensitive data. The comparison discussed with respect to step 605 optionally includes direct textual comparison or comparison of textual patterns, as described below.

In a related embodiment, the data processing application determines the data sensitivity value at step 605 at least in part based upon at least one sensitive data pattern associated with the text analytics learning model. As further described herein, the data processing application derives the at least one sensitive data pattern in the context of configuring the text analytics learning model. According to such related embodiment, the data processing application evaluates data within the selected deduplicated data block by facilitating comparison of any identified pattern within the block data to the at least one sensitive data pattern. The data processing application optionally determines a relatively higher data sensitivity value for the selected deduplicated data block responsive to determining a relatively higher correlation between any identified pattern within the block data and the at least one sensitive data pattern.

In an embodiment, the data sensitivity value determined for the deduplicated data block at step 605 is quantitative. According to such embodiment, the quantitative data sensitivity value optionally is normalized and/or optionally is on a predefined scale, e.g., between 0 and 1, with 0 indicating lowest sensitivity and 1 indicating highest sensitivity. In an additional embodiment, the data processing application determines the data sensitivity value of the selected deduplicated data block by determining respective data sensitivity values for respective portions of the selected deduplicated data block. A method with regard to determining the data sensitivity value of the selected deduplicated data block according to step 605 is described with respect to FIG. 7.

At step 610, the data processing application determines whether the data sensitivity value of the selected deduplicated data block exceeds a sensitive information threshold. In an embodiment, the sensitive information threshold optionally is on a predefined scale for purposes of comparison to the data sensitivity value. In an additional embodiment, the data processing application predefines the sensitive information threshold based at least in part upon input obtained from at least one external entity, e.g., a data processing system administrator or a data processing system client. Responsive to determining that the data sensitivity value of the selected deduplicated data block does not exceed the sensitive information threshold, the data processing application proceeds to the end of the method 600. Responsive to determining that the data sensitivity value of the selected deduplicated data block exceeds the sensitive information threshold, at step 615 the data processing application classifies as sensitive the selected deduplicated data block.

In the context of classifying as sensitive the selected deduplicated data block, the data processing application optionally labels or otherwise marks the selected deduplicated data block, e.g., in the previously described reference list. In an embodiment, in the context of applying at least one result of the text analytics to any document among the collection of unstructured documents including the selected deduplicated data block according to step 425, the data processing application classifies as sensitive any document or at least one portion thereof including the selected deduplicated data block classified as sensitive. In a further embodiment, the data processing application implements access control with respect to any document or at least one portion thereof including the selected deduplicated data block classified as sensitive.

In sum, applying text analytics to the selected deduplicated data block according to the method 600 includes determining a data sensitivity value of the selected deduplicated data block by evaluating block data in view of a text analytics learning model and, responsive to determining that the data sensitivity value of the selected deduplicated data block exceeds a sensitive information threshold, classifying as sensitive the selected deduplicated data block.

Figure 7:
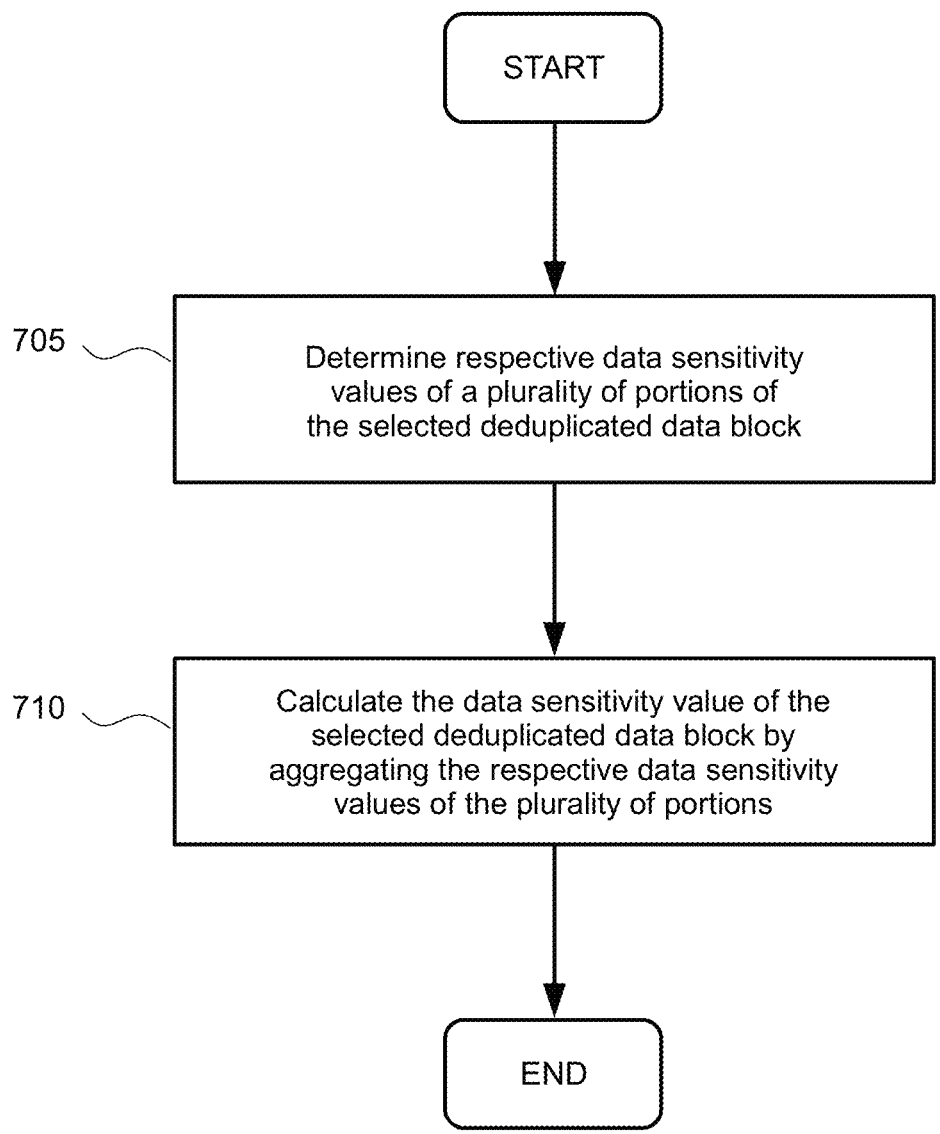
FIG. 7 illustrates a method of determining a data sensitivity value of a deduplicated data block selected in the context of unstructured document processing, according to one or more embodiments.

FIG. 7 illustrates a method 700 of determining the data sensitivity value of the selected deduplicated data block. The method 700 provides one or more embodiments with respect to step 605 of the method 600. The method 700 begins at step 705, where the data processing application determines respective data sensitivity values of a plurality of portions of the selected deduplicated data block by evaluating data in the plurality of portions in view of the text analytics learning model. In an embodiment, the respective data sensitivity values of the plurality of block portions are quantitative. According to such embodiment, the respective quantitative data sensitivity values of the plurality of block portions optionally are normalized and/or optionally are on a predefined scale, e.g., between 0 and 1, with 0 indicating lowest sensitivity and 1 indicating highest sensitivity. At step 710, the data processing application calculates the data sensitivity value of the selected deduplicated data block by aggregating the respective data sensitivity values of the plurality of portions of the selected deduplicated data block as determined at step 705. In an embodiment, the data processing application aggregates the determined respective data sensitivity values of the plurality of block portions by summing the respective data sensitivity values. In an additional embodiment, the data processing application aggregates the determined respective data sensitivity values of the plurality of block portions by averaging the respective data sensitivity values.

In an embodiment, the data processing application optionally classifies sensitivity at a block portion level, such that the data processing application classifies as sensitive any portion of the selected deduplicated data block having a respective data sensitivity value exceeding the sensitive information threshold. In the context of classifying as sensitive one or more respective portions of the selected deduplicated data block, the data processing application optionally labels or otherwise marks such one or more respective portions, e.g., in the previously described reference list. In an additional embodiment, in the context of applying at least one result of the text analytics to any document among the collection of unstructured documents including the selected deduplicated data block according to step 425, the data processing application classifies as sensitive any document or at least one portion thereof including the one or more respective portions of the selected deduplicated data block classified as sensitive. In a further embodiment, the data processing application implements access control with respect to any document or at least one portion thereof including the one or more respective portions of the selected deduplicated data block classified as sensitive.

In sum, determining the data sensitivity value of the selected deduplicated data block according to the method 700 includes determining respective data sensitivity values of a plurality of portions of the selected deduplicated data block by evaluating portion data in view of the text analytics learning model and calculating the data sensitivity value of the selected deduplicated data block by aggregating the respective data sensitivity values of the plurality of portions of the selected deduplicated data block.

Figure 8:
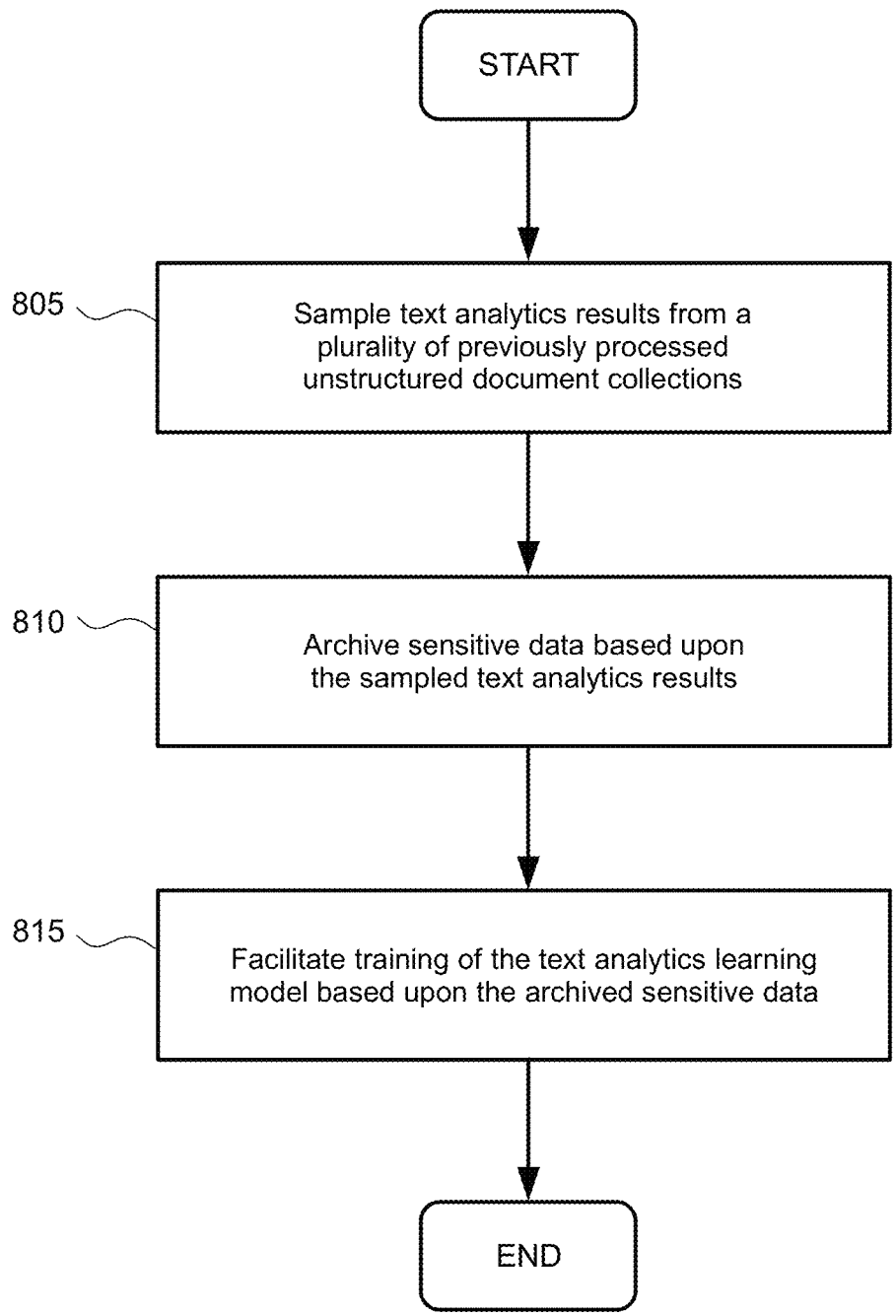
FIG. 8 illustrates a method of configuring a text analytics learning model, according to one or more embodiments.

FIG. 8 illustrates a method 800 of configuring the text analytics learning model. The method 800 begins at step 805, where the data processing application samples text analytics results from a plurality of previously processed unstructured document collections. In an embodiment, the data processing application predetermines sampling granularity of the text analytics results from the plurality of previously processed unstructured document collections. According to such embodiment, the data processing application predetermines any text analytics result type(s) to sample and additionally predetermines which document type(s) or document portion type(s) among the previously processed unstructured document collections to sample. According to such embodiment, the data processing application predetermines sampling granularity based at least in part upon input obtained from at least one external entity, e.g., a data processing system administrator or a data processing system client.

At step 810, the data processing application archives sensitive data based upon the sampled text analytics results. In an embodiment, the data processing application archives sensitive data by identifying sensitive data within the sampled text analytics results based upon direct textual comparison and/or textual pattern comparison of already archived sensitive data to the sampled text analytics results. In an additional embodiment, the data processing application identifies sensitive data within the sampled text analytics results via application of NLP, e.g., NLU. According to one or both embodiments, upon identifying sensitive data within the sampled text analytics results, the data processing application archives the identified sensitive data by facilitating organization, e.g., indexing, of the archived sensitive data based upon personal data classes and/or based upon confidential data classes within at least one knowledge base associated with the text analytics learning model.

In an embodiment, the data processing application archives sensitive data based upon the sampled text analytics results by deriving at least one sensitive data pattern based upon the sampled text analytics results. According to such embodiment, the data processing application applies NLP to the sampled text analytics results in order to derive the at least one sensitive data pattern. According to such embodiment, the NLP applied to the sampled text analytics results includes NLU. Optionally, the at least one sensitive data pattern includes at least one n-gram pattern associated with personal data. For instance, a sensitive data pattern among the at least one sensitive data pattern optionally includes respective n-gram patterns associated with individual birthdates. Additionally or alternatively, the at least one sensitive data pattern includes at least one n-gram pattern associated with confidential data. For instance, a sensitive data pattern optionally includes an n-gram pattern associated with a password or other authentication data. In a related embodiment, the data processing application applies contextual analytics to the sampled text analytics results in order to derive the at least one sensitive data pattern. In a further related embodiment, the data processing application applies logical relationship analytics to the sampled text analytics results in order to derive the at least one sensitive data pattern.

At step 815, the data processing application facilitates training of the text analytics learning model based upon the archived sensitive data. The data processing application facilitates model training based upon the archived sensitive data by factoring the archived sensitive data into any text analytics algorithm associated with the model. Accordingly, the data processing application facilitates training of the model in order to facilitate deduplicated data block evaluation. According to an embodiment in which the data processing application derives at least one sensitive data pattern based upon the sampled text analytics results, the data processing application facilitates model training based upon the at least one sensitive data pattern. In an embodiment, the data processing system updates at least one knowledge base associated with the model based upon model training and/or other configuration activities. In an additional embodiment, the data processing system reconfigures the model by executing steps of the method 800 upon executing steps of the method 400 for a respective collection of unstructured documents.

In sum, configuring the text analytics learning model according to the method 800 includes sampling text analytics results from a plurality of previously processed unstructured document collections, archiving sensitive data based upon the sampled text analytics results, and facilitating training of the text analytics learning model based upon the archived sensitive data.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented unstructured document processing method that enables block-based text analytics, the method comprising:
    identifying a plurality of deduplicated data blocks associated with a collection of unstructured documents;
    sorting the plurality of deduplicated data blocks in descending order based upon at least one block frequency metric;
    selecting a highest sorted unprocessed deduplicated data block;
    applying text analytics to the selected deduplicated data block by facilitating application of at least one natural language processing technique; and
    applying at least one result of the text analytics to any document among the collection of unstructured documents including the selected deduplicated data block, wherein applying the at least one result comprises labelling document data based upon data attributes determined from the text analytics and characterizing the labelled document data based upon application of at least one machine learning technique.

2. The method of claim 1, further comprising:
    terminating the unstructured document processing method responsive to determining that unique document usage frequency of a next unprocessed deduplicated data block to be selected is below a predetermined document impact threshold.

3. The method of claim 1, further comprising:
    terminating the unstructured document processing method responsive to determining that unique block occurrence frequency of a next unprocessed deduplicated data block to be selected is below a predetermined block occurrence threshold.

4. The method of claim 1, further comprising:
    terminating the unstructured document processing method responsive to determining that a predetermined unstructured document assessment period has expired.

5. The method of claim 1, further comprising:
    terminating the unstructured document processing method responsive to determining that a number of deduplicated data blocks among the plurality of deduplicated data blocks to which text analytics have been applied exceeds a predetermined block text analytics threshold.

6. The method of claim 1, further comprising:
    terminating the unstructured document processing method responsive to determining that a number of documents among the collection of unstructured documents to which at least one text analytics result has been applied exceeds a predetermined analytics result assignment threshold.

7. The method of claim 1, wherein applying text analytics to the selected deduplicated data block comprises:
    determining a data sensitivity value of the selected deduplicated data block by evaluating block data in view of a text analytics learning model.

8. The method of claim 7, wherein applying text analytics to the selected deduplicated data block further comprises:
    responsive to determining that the data sensitivity value of the selected deduplicated data block exceeds a sensitive information threshold, classifying as sensitive the selected deduplicated data block.

9. The method of claim 7, wherein determining the data sensitivity value of the selected deduplicated data block comprises:
    determining respective data sensitivity values of a plurality of portions of the selected deduplicated data block by evaluating portion data in view of the text analytics learning model; and
    calculating the data sensitivity value of the selected deduplicated data block by aggregating the respective data sensitivity values of the plurality of portions of the selected deduplicated data block.

10. The method of claim 7, wherein configuring the text analytics learning model comprises:
    sampling text analytics results from a plurality of previously processed unstructured document collections.

11. The method of claim 10, wherein configuring the text analytics learning model further comprises:
    archiving sensitive data based upon the sampled text analytics results; and
    facilitating training of the text analytics learning model based upon the archived sensitive data.

12. The method of claim 1, wherein the at least one block frequency metric includes a unique document usage frequency value corresponding to a number or a percentage of documents among the collection of unstructured documents in which a block among the plurality of deduplicated data blocks is located.

13. The method of claim 1, wherein the at least one block frequency metric includes a unique block occurrence frequency value corresponding to a number of unique occurrences of a block among the plurality of deduplicated data blocks within the collection of unstructured documents.

14. A computer program product comprising a computer readable storage medium having unstructured document processing program instructions embodied therewith that enable block-based text analytics, the unstructured document processing program instructions executable by a computing device to cause the computing device to:
    identify a plurality of deduplicated data blocks associated with a collection of unstructured documents;
    sort the plurality of deduplicated data blocks in descending order based upon at least one block frequency metric;
    select a highest sorted unprocessed deduplicated data block;

apply text analytics to the selected deduplicated data block by facilitating application of at least one natural language processing technique; and apply at least one result of the text analytics to any document among the collection of unstructured documents including the selected deduplicated data block, wherein applying the at least one result comprises labelling document data based upon data attributes determined from the text analytics and characterizing the labelled document data based upon application of at least one machine learning technique.

15. The computer program product of claim 14, wherein applying text analytics to the selected deduplicated data block comprises:

determining a data sensitivity value of the selected deduplicated data block by evaluating block data in view of a text analytics learning model.

16. The computer program product of claim 15, wherein applying text analytics to the selected deduplicated data block further comprises:

responsive to determining that the data sensitivity value of the selected deduplicated data block exceeds a sensitive information threshold, classifying as sensitive the selected deduplicated data block.

17. The computer program product of claim 15, wherein configuring the text analytics learning model comprises:

sampling text analytics results from a plurality of previously processed unstructured document collections.

18. A system comprising:

at least one processor; and a memory storing an application program, which, when executed on the at least one processor, performs an unstructured document processing operation that enables block-based text analytics, the operation comprising:

identifying a plurality of deduplicated data blocks associated with a collection of unstructured documents;

sorting the plurality of deduplicated data blocks in descending order based upon at least one block frequency metric;

selecting a highest sorted unprocessed deduplicated data block;

applying text analytics to the selected deduplicated data block facilitating application of at least one natural language processing technique; and applying at least one result of the text analytics to any document among the collection of unstructured documents including the selected deduplicated data block, wherein applying the at least one result comprises labelling document data based upon data attributes determined from the text analytics and characterizing the labelled document data based upon application of at least one machine learning technique.

19. The system of claim 18, wherein applying text analytics to the selected deduplicated data block comprises:

determining a data sensitivity value of the selected deduplicated data block by evaluating block data in view of a text analytics learning model.

20. The system of claim 19, wherein applying text analytics to the selected deduplicated data block further comprises:

responsive to determining that the data sensitivity value of the selected deduplicated data block exceeds a sensitive information threshold, classifying as sensitive the selected deduplicated data block.

* * * * *